United States Patent
Concannon et al.

(10) Patent No.: US 8,949,138 B2
(45) Date of Patent: Feb. 3, 2015

(54) MANAGING AN INSURANCE PRODUCT WITH AN INSURANCE VALUE CHAIN

(71) Applicant: Quanis Licensing Limited, Ebene (MU)

(72) Inventors: Michael Concannon, Mill Valley, CA (US); John Anthony Levin, London (GB)

(73) Assignee: Quanis Licensing Limited (MU)

( * ) Notice: Subject to any disclaimer, the term of this patent is extended or adjusted under 35 U.S.C. 154(b) by 0 days.

(21) Appl. No.: 13/655,957

(22) Filed: Oct. 19, 2012

(65) Prior Publication Data

US 2013/0103431 A1 Apr. 25, 2013

Related U.S. Application Data

(60) Provisional application No. 61/548,890, filed on Oct. 19, 2011.

(51) Int. Cl.
*G06Q 10/00* (2012.01)
*G06Q 40/08* (2012.01)

(52) U.S. Cl.
CPC .................................. *G06Q 40/08* (2013.01)
USPC .............................................. 705/4; 705/1.1

(58) Field of Classification Search
CPC .............................. G06Q 40/08; G06Q 40/00
USPC ....................................................... 705/1.1, 4
See application file for complete search history.

(56) References Cited

U.S. PATENT DOCUMENTS

| | | | |
|---|---|---|---|
| 7,451,097 B1 | 11/2008 | Faupel et al. | |
| 2003/0018481 A1* | 1/2003 | Zhou et al. | 705/1 |
| 2005/0240451 A1 | 10/2005 | Johnson et al. | |
| 2011/0071858 A1 | 3/2011 | Keefer | |
| 2011/0125651 A1 | 5/2011 | Reynolds et al. | |

FOREIGN PATENT DOCUMENTS

| | | |
|---|---|---|
| KR | 1020010100450 A | 11/2001 |
| WO | WO-2013059620 A2 | 4/2013 |
| WO | WO-2013059620 A3 | 4/2013 |

OTHER PUBLICATIONS

"ACORD & XBRL US: White Paper XML Standards and the Insurance Value Chain", (Feb. 2005), 21 pgs.

"Bill Poole's Creative Abrasion—Value Chain Analysis", [online]. [retrieved on Apr. 27, 2011]. Retrieved from the Internet: <URL: http://bill-poole.blogspot.com/2008/07/value-chain-analysis.html>, (Jul. 31, 2008), 5 pgs.

(Continued)

*Primary Examiner* — William Rankins
(74) *Attorney, Agent, or Firm* — Schwegman Lundberg & Woessner, P.A.

(57) ABSTRACT

A method of managing an insurance value chain is disclosed. A specification of an insurance policy having a set of attributes is received. Sets of values corresponding to the set of attributes are received. The sets of values are derived from negotiations with stake holders of an insurance value chain. Versions of the insurance policy are generated. Each of the versions of the insurance policy corresponds to a unique one of the sets of values. An aggregation of information regarding the versions of the insurance policy is presented via a user interface of an insurance value chain application.

18 Claims, 13 Drawing Sheets

(56) References Cited

OTHER PUBLICATIONS

"Industry Value Chains", [online]. (c)2011 Open Text Corporation. [retrived on Apr. 27, 2011]. Retrieved from the Internet: <URL: http://www.opentext.com/2/global/solutions/sol-ind-insurance/sol-education-insurance-vc-...>, 1 pg.

"Insurance Value Chain Scenarios and Live Demos", [online]. (C) 2001-2011 Softpedia. [retrieved on Apr. 27, 2011]. Retrieved from the Internet: >URL http://news.softpedia.com/news/insurance-Value-Chain-Scenarios-and-Live-Demos-55230...>, (2011), 2 pgs.

"International Application Serial No. PCT/US2012/061064, International Search Report mailed Jul. 24, 2013", 3 pgs.

"International Application Serial No. PCT/US2012/061064, Written Opinion mailed Jul. 24, 2013", 4 pgs.

"Microsoft Unveils Insurance Value Chain Architecture Framework v1.0 at ACORD LOMA Insurance Systems Forum", [online]. (c) Microsoft(r) [retrived on Apr. 27, 2011]. Retrieved from the Internet: <URL: http://www.microsoft.com/presspass/features/2006/may06/05-22Insurance.mpx>, (May 22, 2006), 3 pgs.

"Portrait Software Joins Microsoft; Insurance Value Chain Program", [online]. [retrieved on Apr. 27, 2011]. Retrieved from the Internet: <URL: http://www.portraitsoftware.com/newsandevents/press-releases/post_05_press_releases/po...>, (May 22, 2006), 2 pgs.

"Solutions A-Z", [online]. StoneRiver tm. [online]. [retrived on Apr. 27, 2011]. Retrieved from the Internet: <URL: http://www.stoneriver.com/content/solutions-z>, (2011), 2 pgs.

"Value Chain", from Wikipedia(r), the free encyclopedia. [online]. [retrived on Apr. 27, 2011]. Retrieved from the Internet: <URL: http://en.wikipedia.org/wiki/Value_chain>, (2011), 4 pgs.

Easey, C., "Examples of Health Insurance Value Chain", [online]. [retrieved on Apr. 27, 2011]. Retrieved from the Internet: <URL: http://www.ehow.com/about_5273186_examples-health-insurance-value-chain.html>, (2011), 4 pgs.

Teufel, P., et al., "Insurance Risk 101", (c) 2001 American Academy of Actuaries, (Jul. 9, 2001), 39 pgs.

Woodman, D., "Introduction to the Insurance Value Chain Integration Factory", [online]. (c) 2011 Microsoft. [retrieved on Apr. 27, 2011]. Retrieved from the Internet: <URL: http://msdn.microsoft.com/en-us/library/bb417065(d=printer).aspx>, (May 2007), 8 pgs.

"International Application Serial No. PCT/US2012/061064, International Preliminary Report on Patentability mailed Mar. 10, 2014", 6 pgs.

\* cited by examiner

FIG. 6

| FAMILY INCOME BENEFIT | | |
|---|---|---|
| DETAILS | PRODUCT DETAILS | |
| PRODUCT VARIABLES | | CANCEL APPROVAL   CHANGE PRODUCT |
| GET PRICE | DETAILS | |
| QUESTIONS | SPONSORING PRIMARY CARRIER: | MGM ADVANTAGE ▽ |
| WORDINGS | NAME: | FAMILY INCOME BENEFIT |
| COMMUNICATION | DESCRIPTION: | |
| | TYPE: | INCOME PROTECTION INSURANCE ▽ |
| | SUBTYPE: | TERM LIFE INDIVIDUAL ▽ |
| | STATE: | APPROVED |
| | VERSION: | 1 |
| | START DATE: | |
| | TERMINATION DATE: | |
| | DATE CREATED: | 18/11/2010 |

*FIG. 7*

| FAMILY INCOME BENEFIT | | | | |
|---|---|---|---|---|
| DETAILS | PRODUCT SPECIFICATION | RISK PREMIUM RATE VARIABLES | COVERAGE CALCULATION VARIABLES | VALUE MAINTENANCE VARIABLES |
| PRODUCT VARIABLES | | CANCEL APPROVAL | | CHANGE PRODUCT |
| GET PRICE | | | | |
| QUESTIONS | | | | |
| WORDINGS | | | | |
| COMMUNICATION | | | | |

PRODUCT SPECIFICATION

| | |
|---|---|
| AGE CALCULATION BASIS | NEAREST BIRTHDAY ▽ |
| EXPIRY AGE | 31040 |
| PREMIUM PER DAY [MIN:MAX] | 1:00 MIN  50,000:00 MAX |
| ISSUE AGE [MIN:MAX] | 18 YRS  0 MONTHS  0 DAYS |
| | 99 YRS  0 MONTHS  0 DAYS |
| SUM ASSURED [MIN:MAX] | 5 MIN  30 MAX |
| TERM CHANGE ALLOWED | ● YES  ○ NO |
| OWNERSHIP TRANSFERABLE | ○ YES  ● NO |
| INCREASING ALLOWED | ○ YES  ● NO |
| ADDING PERSON TO COVER | ○ YES  ● NO |
| REMOVE PERSON TO COVER | ○ YES  ● NO |
| RENEWABILITY | ○ YES  ● NO |
| CONVERSION PRIVILEGE | ○ YES  ● NO |
| EFFECTIVE DATE OF COVERAGE | SOME FUTURE DATE ▽ |
| COOLING OFF PERIOD | 30.00 DAYS |

FAMILY INCOME BENEFIT

| DETAILS |
|---|
| PRODUCT VARIABLES |
| GET PRICE |
| QUESTIONS |
| WORDINGS |
| COMMUNICATION |

CANCEL APPROVAL    CHANGE PRODUCT

GET PRICE

SELECT PRICE TABLE: FIRST PRICING TABLE ▽

RETAIL RATE TABLE FEMALE SMOKER

| START AGE | CURRENT AGE | YEAR | RATE |
|---|---|---|---|
| 18 | 18 | 0 | 0.0714000000 |
| 18 | 19 | 1 | 0.0719000000 |
| 18 | 20 | 2 | 0.0729000000 |
| 18 | 21 | 3 | 0.0738000000 |
| 18 | 22 | 4 | 0.0748000000 |
| 18 | 23 | 5 | 0.0757000000 |
| 18 | 24 | 6 | 0.0771000000 |
| 18 | 25 | 7 | 0.0786000000 |
| 18 | 26 | 8 | 0.0805000000 |
| 18 | 27 | 9 | 0.0828000000 |

UPLOADED BY: JOHN BLAKE, CREATE DATE: 1/28/2011

RETAIL RATE TABLE MALE NON SMOKER

| START AGE | CURRENT AGE | YEAR | RATE |
|---|---|---|---|
| 18 | 18 | 0 | 0.1203000000 |
| 18 | 19 | 1 | 0.1209000000 |
| 18 | 20 | 2 | 0.1218000000 |
| 18 | 21 | 3 | 0.1228000000 |
| 18 | 22 | 4 | 0.1237000000 |
| 18 | 23 | 5 | 0.1249000000 |
| 18 | 24 | 6 | 0.1262000000 |
| 18 | 25 | 7 | 0.1277000000 |
| 18 | 26 | 8 | 0.1295000000 |
| 18 | 27 | 9 | 0.1317000000 |

UPLOADED BY: JOHN BLAKE, CREATE DATE: 1/28/2011

| FAMILY INCOME BENEFIT | | | CANCEL APPROVAL | CHANGE PRODUCT |
|---|---|---|---|---|
| DETAILS | BOOKLETS | TEMPLATES | DYNAMIC TAGS | |

PRODUCT VARIABLES
GET PRICE
QUESTIONS
WORDINGS
COMMUNICATION

TEMPLATES

| NAME | DESCRIPTION | CREATED BY | DATE CREATED |
|---|---|---|---|
| QUOTATION_COVER_LETTER_FOLLOWUP_V1 | | | 18/11/2010 |
| COMPLETION_OF_APPLICATION_COVER_LETTER_V1 | | | 18/11/2010 |
| CONFIRMATION_OF_COVERAGE_COVER_LETTER_V1 | | | 18/11/2010 |
| NURSE_SCREENING_LETTER_V1 | | | 18/11/2010 |
| INTERMEDIARY_KEY_FACTS_DOCUMENT_V1 | | | 18/11/2010 |
| REFUSAL_TO_BE_TESTED_DECLARATION_V1 | | | 18/11/2010 |
| CONFIRMATION_OF_COMMENCEMENT_DATE_OF_POLICY_V1 | | | 18/11/2010 |
| MEDICAL_EXAMINATION_REQUEST_LETTER | | | 18/11/2010 |
| COVER SUMMARY AND APPLICATION DETAILS_DOCUMENT_V1 | | | 18/11/2010 |
| DECLINATION LETTER_V1 | | | 25/11/2010 |
| HIV_INFORMATION_DOCUMENT_V1 | | | 18/11/2010 |
| HIV_COVER_LETTER_V1 | | | 18/11/2010 |
| COVER_SUMMARY_AND_APPLICATION_DETAILS_COVER_LETTER_V1 | | | 18/11/2010 |
| NOTIFICATION_OF_POLICY_DOCUMENTS_BEING_SENT_COVER_LETTER_V1 | | | 18/11/2010 |
| ILLUSTRATIVE_QUOTATION_V1 | | | 18/11/2010 |
| POLICY_COMMENCEMENT_CHANGE_OF_ADDRESS_INSTRUCTION_FORM_V1 | | | 18/11/2010 |
| PRIMARY_CARRIER_KEY_FEATURES_DOCUMENT_V1 | | | 18/11/2010 |
| NOTIFICATION_OF_DIRECT_DEBIT_SET_UP_AND_POLICY_START_DATE_V1 | | | 18/11/2010 |
| STATEMENT_OF_TERMS_V1 | | | 18/11/2010 |
| CONTRACT_DETAILS_CONFIRMATION_FORM_V1 | | | 18/11/2010 |

◁◁ ◁ 1 2 ▷ ▷▷   23 ITEMS IN 2 PAGES

FIG. 10

| HOME | SJP | NUCLEUS | PRODUCTS | VALUE CHAINS | MANUAL UW | UW MANAGEMENT | ADMIN |
|---|---|---|---|---|---|---|---|

HOME > VALUE CHAINS > FAMILY INCOME BENEFIT

FAMILY INCOME BENEFIT

| VALUE CHAIN DETAILS | |
|---|---|
| PRODUCT | |
| SUPPLY CHAIN | |
| ORDER PROCESSING | |
| TEST PRICE | |

| REVENUE ALLOCATION | COLLECTIONS |
|---|---|

REVENUE ALLOCATION

| SH GROUPS & SUBGROUPS | % | FIXED FEE | TERMS (DAYS) | METHOD | |
|---|---|---|---|---|---|
| IFAFirm | 1.00 | 2.00 | 3 | CHECK | ▷ |
| PlatformOwner | 2.00 | 2.00 | 3 | CHECK | ▷ |
| Reseller | 3.00 | 2.00 | 3 | DD | ▷ |
| Reinsurer | 4.00 | 2.00 | 3 | DD | ▷ |
| IPS | 5.00 | 2.00 | 3 | CHECK | ▷ |
| IFAnonFSA | 6.00 | 2.00 | 3 | DD | ▷ |
| Carrier | 7.00 | 2.00 | 33 | DD | ▷ |
| Unknown | 8.00 | 2.00 | 3 | DD | ▷ |
| IFA | 9.00 | 2.00 | 3 | DD | ▷ |

CANCEL APPROVAL

SAVE

MANAGING AN INSURANCE PRODUCT WITH AN INSURANCE VALUE CHAIN

RELATED APPLICATIONS

This application claims the benefit of U.S. Provisional Application No. 61/548,890, filed Oct. 19, 2011, entitled "MANAGING AN INSURANCE PRODUCT WITH AN INSURANCE VALUE CHAIN," which is incorporated herein by reference in its entirety.

BACKGROUND

Insurance is typically viewed as a form of risk management, in terms of which there is a transfer of risk from an insured party to an insurer party in exchange for a premium. An insurer may be a corporation selling the insurance, while an insured (e.g., the policy holder or owner) is typically a person or an entity that is buying the insurance. An insurer charges the insured a premium, which is typically a once-off or recurring monetary payment from the insured to the insurer in exchange for the assumption of the risk by the insurer. There are many types of insurance, such as auto insurance, home insurance, health insurance, disability insurance, casualty insurance, life insurance, and credit insurance, to name but a few.

Life insurance (or assurance) is typically provided in terms of a contract between a policy owner and an insurer. The contract may obligate the insurer to pay a sum of money to a beneficiary specified by the policy holder upon the policy holder's death, terminal illness or catastrophic event.

The insurer typically calculates policy prices using mortality tables (i.e., statistically-based tables showing expected annual mortality rates). Main variables in mortality tables have traditionally been age, gender and use of tobacco.

Life insurance is often provided in two basic classes, namely temporary life insurance or permanent life insurance. Temporary life insurance provides coverage for a specified term of years for a specified premium, while permanent life insurance remains in force until the relevant policy matures or pays out.

BRIEF DESCRIPTION OF THE DRAWINGS

Some embodiments are illustrated by way of example and not limitation in the figures of the accompanying drawings in which:

FIG. 6 is an example user interface for specifying details of an insurance value chain;

FIG. 7 is an example user interface for specifying details of a product;

FIG. 8 is an example user interface for specifying values or ranges of values of a set of product variables corresponding to a specification of a product;

FIG. 9 is an example user interface for getting a price of a product;

FIG. 10 is an example user interface for selecting a wording of a policy associated with a product;

FIG. 12 is an example user interface for specifying order processing information;

FIG. 13 is an example user interface for testing a price of a product; and

DETAILED DESCRIPTION

Figure 1:
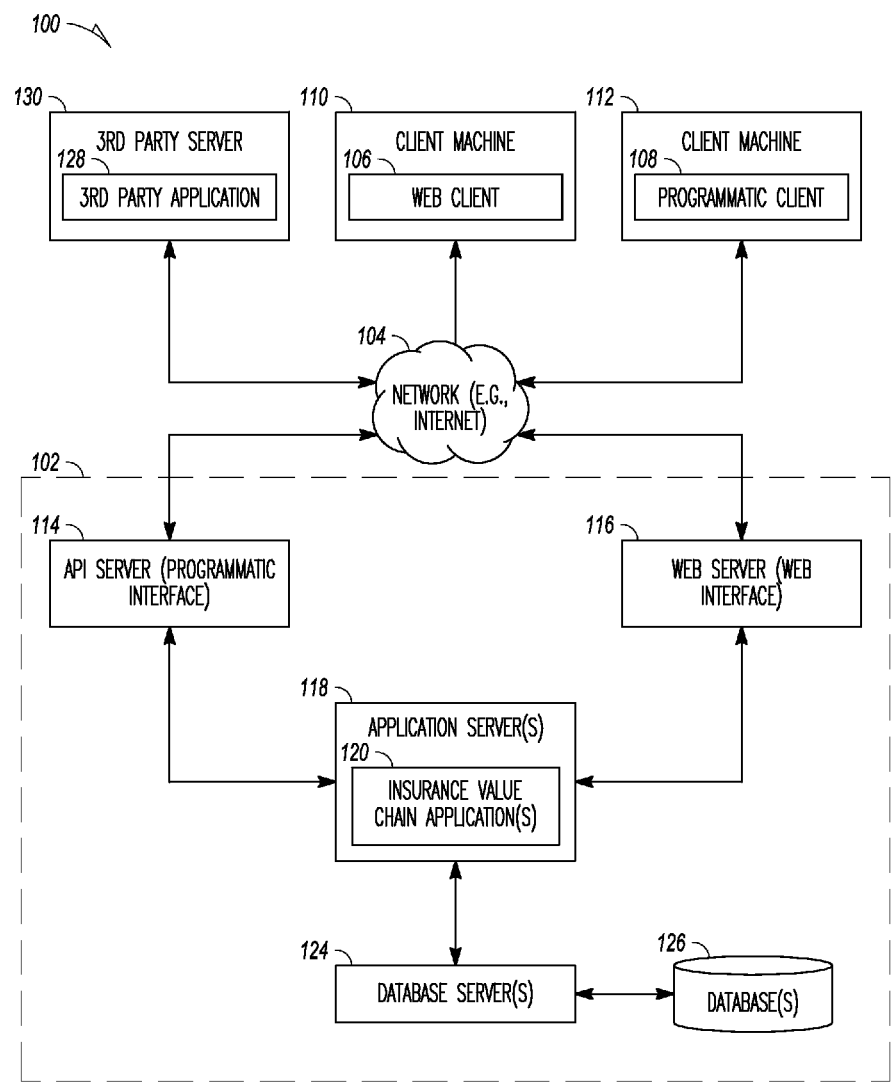
FIG. 1 is a network diagram depicting a client-server system within which various example embodiments may be deployed.

In the following description, for purposes of explanation, numerous specific details are set forth in order to provide an understanding of various embodiments of the present subject matter. It will be evident, however, to those skilled in the art that various embodiments may be practiced without these specific details.

An insurer may benefit from being able to customize an insurance product for each of various parties associated with a distribution of the insurance product. An insurance value chain application may enable the insurer to quickly build and test multiple versions of a generic insurance product, such as a term life insurance product, (e.g., by customizing various attributes of the generic insurance product), approve the version of the generic insurance product for distribution by the various parties, and keep track of the status of the versions of the product (e.g., sales, commissions, etc.). Thus, the insurance value chain application may enable an insurer to manage a different version of an insurance product for each party associated with the distribution of the insurance product. In this example, the value chain of the insurance product may comprise all of the versions of an insurance product approved by the insurer for distribution by the various parties in the insurer's distribution network or supply chain.

A generic insurance product may be an insurance product of a particular type (e.g., a term life insurance product). A version of the generic insurance product may be an insurance product of the same type as the generic insurance product, but for which one or more configurable attributes have been specified (e.g., a commission amount, a term of payment, or a customer documentation item).

The insurance value chain application may enable the insurer to manage various permutations of a generic insurance product, such as a first version of term life product that is sold directly on the web and a second version of an insurance product that is sold by a broker. In this example, the second version of the insurance product may offer favorable commission rates to the broker based on a volume of sales by the broker, whereas the first version of the insurance product may not offer any commission. Or the insurer may approve a version of the insurance product for distribution exclusively by the broker (e.g., one offering different payment terms) based on feedback received from the broker about insurance products that the broker's potential clients are seeking.

Each version of an insurance product may have multiple sub-versions; thus, multiple master/parent child relationships may exist for a generic insurance product. For example, payment terms associated with each version of the product may be different for each broker in the insurer's distribution network (e.g., based on negotiated business deals). Thus, there may be an explosion of permutations of an insurance product through the insurer's distribution chain, each having different configurable attributes (e.g., wordings, rates, exclusions, etc.). The value chain application may enable the insurer to manage all possible permutations of an umbrella (or generic) insurance product (e.g., via a single or unified user interface).

Consistent with various embodiments, a method of managing an insurance value chain is disclosed. A specification of an insurance policy having a set of attributes is received. Sets of values corresponding to the set of attributes are received. The sets of values are derived from negotiations with stake holders of an insurance value chain. Versions of the insurance policy are generated. Each of the versions of the insurance policy corresponds to a unique one of the sets of values. An aggregation of information regarding the versions of the insurance policy is presented via a user interface of an insurance value chain application.

These methods and the various embodiments disclosed herein may be implemented as a computer system having one or more modules (e.g., hardware modules or software modules). These methods and the various embodiments disclosed herein may be embodied as instructions stored on a machine-readable medium that, when executed by a processor, cause the processor to perform the instructions.

FIG. 1 is a network diagram depicting a client-server system 100, within which various example embodiments may be deployed. A networked system 102, in the example forms of a network-based marketplace or other publication system, provides server-side functionality, via a network 104 (e.g., the Internet or Wide Area Network (WAN)) to one or more clients. FIG. 1 illustrates, for example, a web client 106 (e.g., a browser, such as the Internet Explorer browser developed by Microsoft Corporation of Redmond, Wash.) and a programmatic client 108 executing on respective client machines 110 and 112.

An API server 114 and a web server 116 are coupled to, and provide programmatic and web interfaces respectively to, one or more application servers 118. The application servers 118 host one or more insurance value chain applications 120. The application servers 118 are, in turn, shown to be coupled to one or more databases servers 124 that facilitate access to one or more databases or NoSQL or non-relational data stores 126.

The insurance value chain applications 120 may provide a number of functions and services to users that access the networked system 102. For example, the insurance value chain application 120 may enable a user to view, configure, or otherwise manage an insurance product (or versions of an insurance product) across an insurance value chain. As will be described in more detail below, such configuring may include configuring sets of values of attributes of the insurance product. While the insurance value chain applications 120 are shown in FIG. 1 to both form part of the networked system 102, in alternative embodiments, the payment applications 122 may form part of a payment service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various insurance value chains applications 120 could also be implemented as standalone software programs, which do not necessarily have networking capabilities. Additionally, although FIG. 1 depicts machines 130, 110, and 112 as being coupled to a single networked system 102, it will be readily apparent to one skilled in the art that machines 130, 110, and 112, as well as applications 128, 106, and 108, may be coupled to multiple networked systems. For example, the application 128, 106, and 108 may be coupled to multiple payment applications, such as payment applications associated with multiple payment processors (e.g., Visa, MasterCard, and American Express).

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be an application that serves as a front-end for the insurance value chain applications 120 to enable administrators of the insurance value chain applications 120 to configure multiple versions of an insurance product.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace or payment functions that are supported by the relevant applications of the networked system 102.

Figure 2:
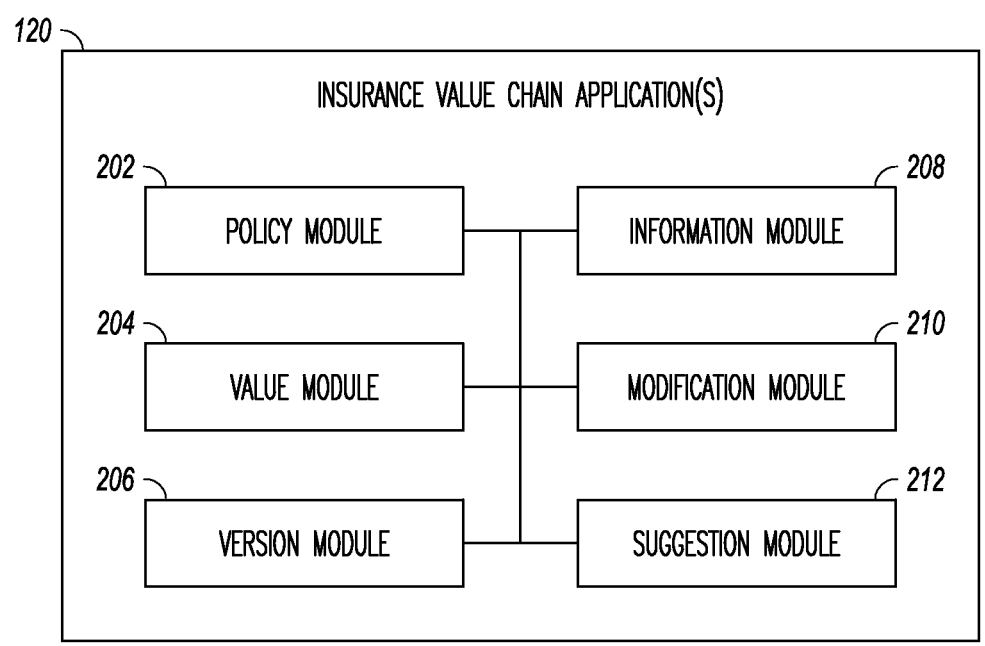
FIG. 2 is a block diagram illustrating example modules of the insurance value chain applications of FIG. 1.

FIG. 2 is a block diagram illustrating example modules of the insurance value chain applications 120. The insurance value chain applications 120 include a policy module 202 that is configured to receive a specification of an insurance policy. The specification may be provided by an entity that provides the insurance policy (e.g., an administrator of the insurance policy). The insurance policy may be a generic or umbrella insurance product or policy. In other words, as used herein, the terms "insurance product" or "insurance policy" may refer to a family of multiple versions of an insurance policy. The insurance policy may have a set of attributes. The attributes of the insurance policy may include any attributes of an insurance policy, including payment terms, commission terms, wording, exclusions, and so on.

The insurance value chain applications 120 include a value module 204 that is configured to receive sets of values corresponding to the set of attributes of an insurance policy. The sets of values may be derived from negotiations between stake holders of an insurance value chain. For example, different distributors of the insurance policy may each agree upon different sets of values through negotiations with a provider of the insurance policy. For example, a distributor that is anticipated to have a higher volume of sales of the insurance policy may negotiate for a version of the insurance policy having more favorable commission terms than a version of the insurance policy that is offered to a distributor that is anticipated to have a lower volume of sales of the insurance policy.

The insurance value chain applications 120 include a version module 206 that is configured to generate versions of the insurance policy. Each of the versions of the insurance policy may correspond to a unique one of the sets of values corresponding to the set of attributes of the insurance policy. Thus, the number of possible versions of an insurance product may be limited only by the number of possible values of each attribute of the insurance product.

The insurance value chain applications 120 include an information module 208 that is configured to manage information regarding the various versions of an insurance policy. For example, the information module 208 may aggregate the information pertaining to multiple versions of an insurance policy for presentation in a user interface of the insurance value chain applications 120. For example, the information module 208 may present a comparison of the unique sets of values corresponding to the set of attributes of the insurance policy that are derived from negotiations between stake holders of an insurance value chain.

The insurance value chain applications 120 include a modification module 210 that is configured to modify a value of one of the sets of values based on input received via the user interface of the insurance value chain application. For example, an administrator may determine that a payment term for a version of an insurance policy should be adjusted based on a volume of sales of a distributor increasing or decreasing. Accordingly, the modification module 210 may receive input from the administrator specifying a new payment term. The modification module 210 may then update the payment term based on the input.

The insurance value chain applications 120 include a suggestion module 212 that is configured to generate a suggested version of an insurance policy. For example, the suggestion module 212 may generate a suggested version of an insurance policy based on anticipated sales by a potential distributor of the suggested version of the insurance policy in comparison to actual volumes of sales of distributors of current versions of the insurance policy. Thus, an administrator of the insurance policy may quickly approve of a new version of the insurance policy that is appropriate for a specific stake holder of an insurance value chain based on versions of the insurance policy that are currently provided to other stake holders of the insurance value chain.

Figure 3:
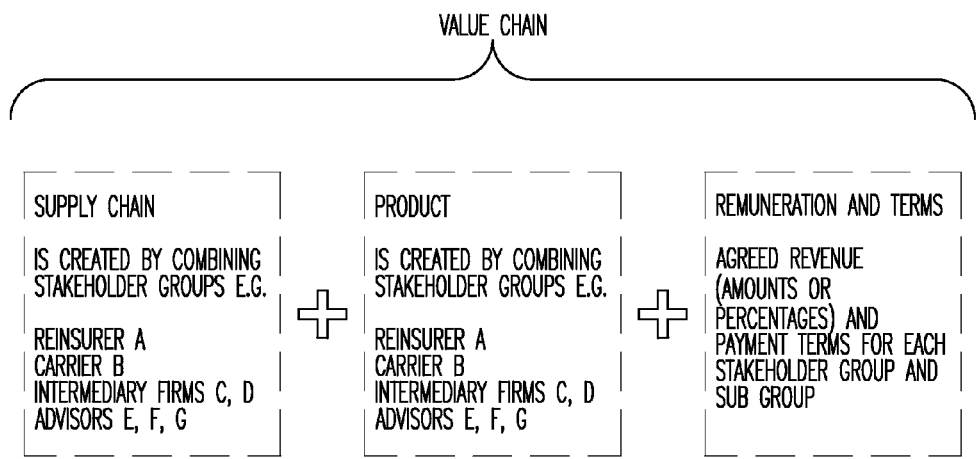
FIG. 3 is a relationship diagram illustrating example embodiments of an insurance value chain.

FIG. 3 is a relationship diagram illustrating example embodiments of an insurance value chain. In some embodiments, the value chain is a combination of defined supply chain stakeholders selling a particular insurance product at agreed revenue and payment terms. In some embodiments, a value chain is a unique logical entity used for both technical and business processing. The various stakeholders may include reinsurers, carriers, intermediary firms, advisors, and so on. The various remuneration and terms may include agreed revenue (amounts or percentages) and payment terms for each stakeholder group and sub group. These various remuneration and terms may correspond to sets of values of the set of attributes of the insurance product.

Figure 4:
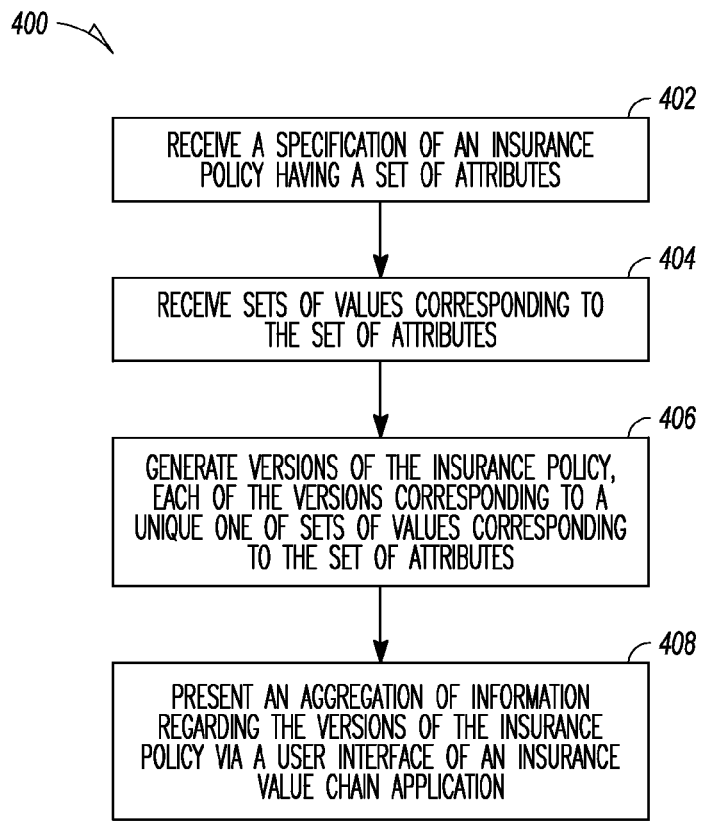
FIG. 4 is a flowchart of an example method of managing an insurance policy with an insurance value chain.

FIG. 4 is a flowchart of an example method 400 of managing an insurance policy with an insurance value chain. At operation 402, the policy module 202 receives or generates a specification of an insurance policy. For example, the policy module 202 may receive a specification of an insurance policy from an entity that is to provide the insurance policy to stake holders of an insurance value chain. As another example, the policy module 202 may generate the specification of the insurance policy based on a combination of information derived from insurance policies that are currently available to or used by various stake holders of an insurance value chain. The specification may associate a set of attributes with the insurance policy. The attributes may include any attributes commonly associated with an insurance policy, such as payment terms, commission terms, wording, exclusions, and so on. The insurance policy may be of a specific type (e.g., life insurance, automobile insurance, homeowner's insurance, and so on). The insurance policy may be a generic or umbrella policy that refers to a family of versions of an insurance policy having a specific type. Thus, a life insurance policy may refer to a number of different versions of a life insurance policy that are created, available to, or used by stake holders within an insurance value chain.

At operation 404, the value module 204 retrieves sets of values corresponding to the set of attributes of an insurance policy. The value module 204 may retrieve the sets of values from various stake holders of an insurance value chain. For example, the value module 204 may query the various stake holders for sets of values corresponding to attributes of life insurance policies offered by the stake holders. As another example, the value module 204 may receive input from an administrator of an insurance policy that specifies multiple sets of values corresponding to the set of attributes of an insurance policy.

At operation 406, the version module 206 generates versions of the insurance policy. Each version of the insurance policy may correspond to a unique one of the sets of attributes that the value module 204 retrieved at operation 404. The value module 204 may also determine ranges of values of the set of attributes corresponding to an insurance policy. For example, the value module 204 may determine the highest and lowest values used by stake holders for a commission term of a life insurance policy. Based on the ranges of values, the value module 204 may determine all possible versions of an insurance policy. The value module 204 may then flag the sets of values as active values based on information about the sets of values received at operation 404.

At operation 408, the information module 208 aggregates information about multiple versions of an insurance policy. For example, the information module 208 may present a comparison of different versions of an insurance policy in a user interface of the insurance value chain applications 120. The presenting of the comparison may include presenting a comparison of the different sets of values of each of the versions of the insurance policy. The presenting of the comparison may also include presenting information regarding the possible sets of values of each corresponding to the set attributes of the insurance policy. The information module 208 may determine whether a particular value of a set of values is out of the ordinary based on a comparison of the particular value with other sets of values. Thus, the information module 208 may aggregate the information to identify particular stake holders within an insurance value chain are receiving favorable or less favorable terms or treatment with respect to other stake holders.

At operation 410, the modification module 210 modifies a value of a set of values. For example, the modification module 210 may determine that a particular value of a set of values of a version of an insurance policy offered to a particular stake holder is unfavorable to an administrator of the insurance based on the values of the other versions of the insurance policy offered to other stakeholders. Accordingly, the modification module 210 may modify a particular value of a version of an insurance policy to bring the version of the insurance policy in line with the other insurance policies. As another example, the modification module 210 may receive input from an administrator of the insurance policy that a particular value of a set of values of a version of an insurance policy should be changed. Accordingly, the modification module 210 may update the value based on the input from the administrator.

Figure 5:
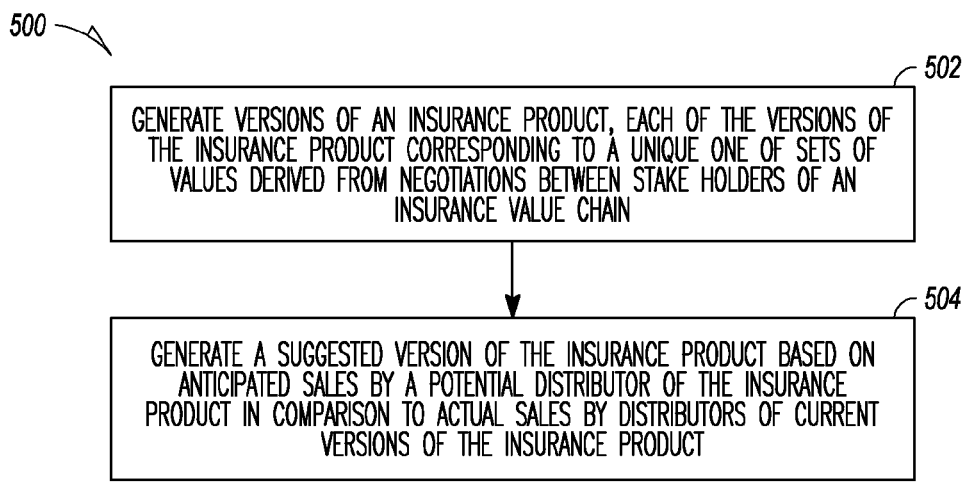
FIG. 5 is a flowchart of an example method of managing an insurance product with an insurance value chain.

FIG. 5 is a flowchart of an example method 500 of managing an insurance product with an insurance value chain. At operation 502, the version module 206 generates multiple versions of an insurance product. Here, each of the multiple versions of the insurance product corresponds to a unique one of sets of values corresponding to the set of attributes of an insurance product. Additionally, each of the sets of attributes may be derived from negotiations between stake holders of an insurance value chain.

At operation 504, the suggestion module 212 generates a suggested version of the insurance product. The suggested version of the insurance product may be based on various factors, such as anticipated sales by a potential distributor of the insurance product. The suggested version may also be based on a comparison of the anticipated sales by a potential distributor of the insurance product with actual sales by distributors of current versions of the insurance product. Accordingly, an administrator of the insurance value chain applications 120 may quickly approve of new versions of an insurance product for a particular stake holder in an insurance value chain, knowing that the suggestion module 212 has generated a suggested product that is consistent with the sets of values of current insurance products available to the other stake holders.

Figure 6:
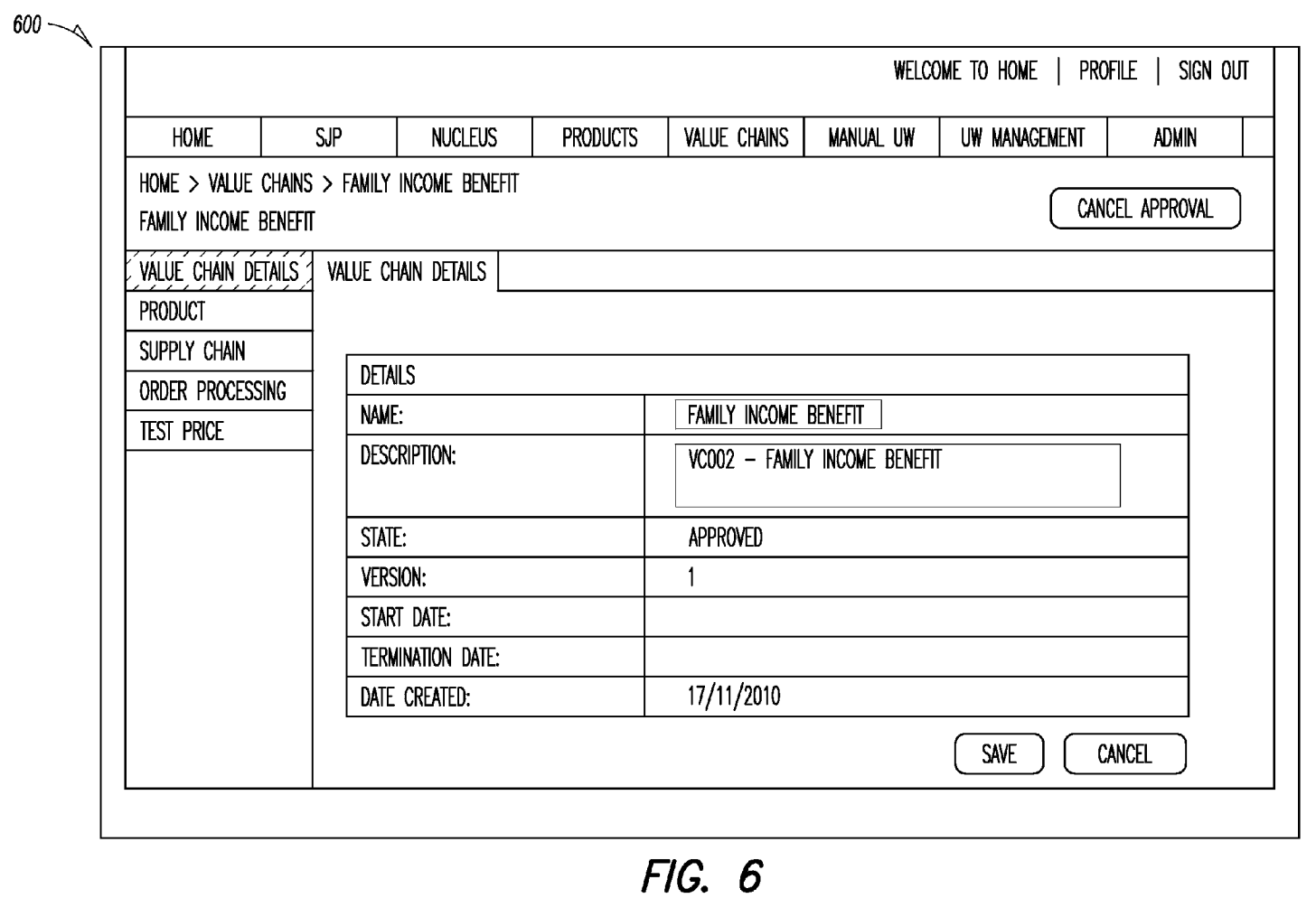

FIG. 6 is an example user interface 600 for specifying details of an insurance value chain. In various embodiments, the example user interface 600 is generated or presented by the policy module 202. The example user interface 600 includes a box for specifying a name of the value chain (e.g., "Family Income Benefit"). The example user interface 600 also includes a box for specifying a description of the product, such as a code (e.g., "VC002") or descriptive text corresponding to the product. The example user interface 600 also includes a box for specifying a state of the value chain. Examples of possible states may include "Approved," meaning the value chain has been approved (e.g., for creation, use, or distribution), or "Pending," meaning the product is awaiting approval. The example user interface 600 also includes a box for specifying a version (e.g., "1") of the value chain. The example user interface 600 also includes boxes for specifying the start date, termination date, and creation date of the value chain. The start date may be the date upon which the value chain is made available and the termination date may be the date upon which the value chain is no longer available. The creation date may be set automatically by the insurance value chain application 120 (e.g., based on a system clock).

FIG. 7 is an example user interface 700 for specifying details of a product. In various embodiments, the example user interface 700 is generated or presented by the value module 204. The example user interface 700 includes a box for specifying a sponsoring primary carrier (e.g., "MBM Advantage"). The example user interface 700 also includes a box for specifying a name of an insurance value chain (e.g., "Family Income Benefit"). The example user interface 700 also includes a box for specifying a description of the product (e.g., "Family Income Benefit"). The example user interface 700 also includes a box for specifying a type of the product (e.g., "Income Protection Insurance"). The example user interface 700 also includes a box for specifying a subtype of the product (e.g., "Term Life Individual"). The example user interface 700 includes a value for specifying a version (e.g., "1") of the product. The example user interface 700 also includes boxes for specifying a start date, termination date, and creation date of the product. The start date may the date upon which the product is made available and the termination date may be the date upon which the product is no longer available. The creation date may be set automatically by the insurance value chain application 120 (e.g., based on a system clock).

FIG. 8 is an example user interface 800 for specifying values or ranges of values of a set of product variables corresponding to a specification of a product. In various embodiments, the user interface 800 is generated or presented by the value module 204. For example, the user interface 800 may include boxes for specifying an age calculation basis (e.g., "Nearest Birthday"), expiry age (e.g., "31040" days), minimum and maximum premiums per day, minimum and maximum issue age (each specified in terms of years, months, and days), minimum and maximum sum assured, whether the sum assured may be changed, whether ownership of the product is transferable, whether increasing of the coverage is allowed, whether an additional person may be added to the coverage, whether a person may be removed from the coverage, whether the product may be renewed, whether the product may be converted into a different product, the date upon which coverage of the product becomes effective (e.g., a future date), and a cooling off period. The example user interface 800 may include tabs corresponding to additional sets of product variables, such as sets of product variables corresponding to risk premium rates, coverage calculation, or value maintenance.

FIG. 9 is an example user interface 900 for getting a price of a product. In various embodiments, the user interface 800 is generated or presented by the value module 204. The user interface 900 may include a box for selecting a price table. Additionally, the user interface 900 may include information pertaining to price tables that may be selected (e.g., a retail rate table for a female smoker or a retail rate table for a male non-smoker).

FIG. 10 is an example user interface 1000 for selecting a wording of a policy associated with a product. In various embodiments, the user interface 800 is generated or presented by the value module 204. The user interface 1000 may include a tab corresponding to templates of wordings that are available to be selected. The tab may include information about each of the templates, such as its name, description, creation date, and creator. The templates may be browsable within a list control. The list control may include buttons for navigating forward or backward through pages of templates. The list control may include a status bar indicating how many items are in the list and in how many pages they are presented. The user interface 1000 may also include a tab corresponding to booklets that may be associated with a product (e.g., for distribution to consumers). The user interface 1000 may also include a tab corresponding to dynamic tags associated with a product.

Figure 11:
FIG. 11 is an example user interface for specifying a supply chain of a product.

FIG. 11 is an example user interface 1100 for specifying a supply chain of a product. In various embodiments, the user interface 800 is generated or presented by the value module 204. The user interface 1100 may include a listing of supply chains defined for a product. The listing may include columns corresponding to fields of each supply chain, such as a name, code, description, and creation date of the supply. The listing may include a column for selecting a supply chain for the product. The user interface 1100 may include a box for searching for a supply chain included in the listing (e.g., based on any of the fields corresponding to the supply chain). The supply chains may be created and each of the fields of each supply chain may defined by an administrator using a separate user interface (not shown).

FIG. 12 is an example user interface 1200 for specifying order processing information. In various embodiments, the user interface 800 is generated or presented by the value module 204. The example user interface 1200 includes tabs for specifying revenue allocation and collections for a product. The example user interface 1200 includes a table (e.g., "Revenue Allocation") for specifying revenue allocation among groups and subgroups. The table includes columns for specifying names or types of groups or subgroups, percentages of revenues, fixed fees, terms (e.g., in days), and methods of payment. Example groups and subgroups for which revenues associated with a product may be allocated include an Independent Financial Advisor (IFA) firm, a platform owner, a reseller, a reinsurer, an insurance planning service (IPS), an IFA that is not a Financial Service Advisor (FSA) (e.g., "IFAnonFSA"), an unknown group or subgroup, or an IFA.

Figure 13:
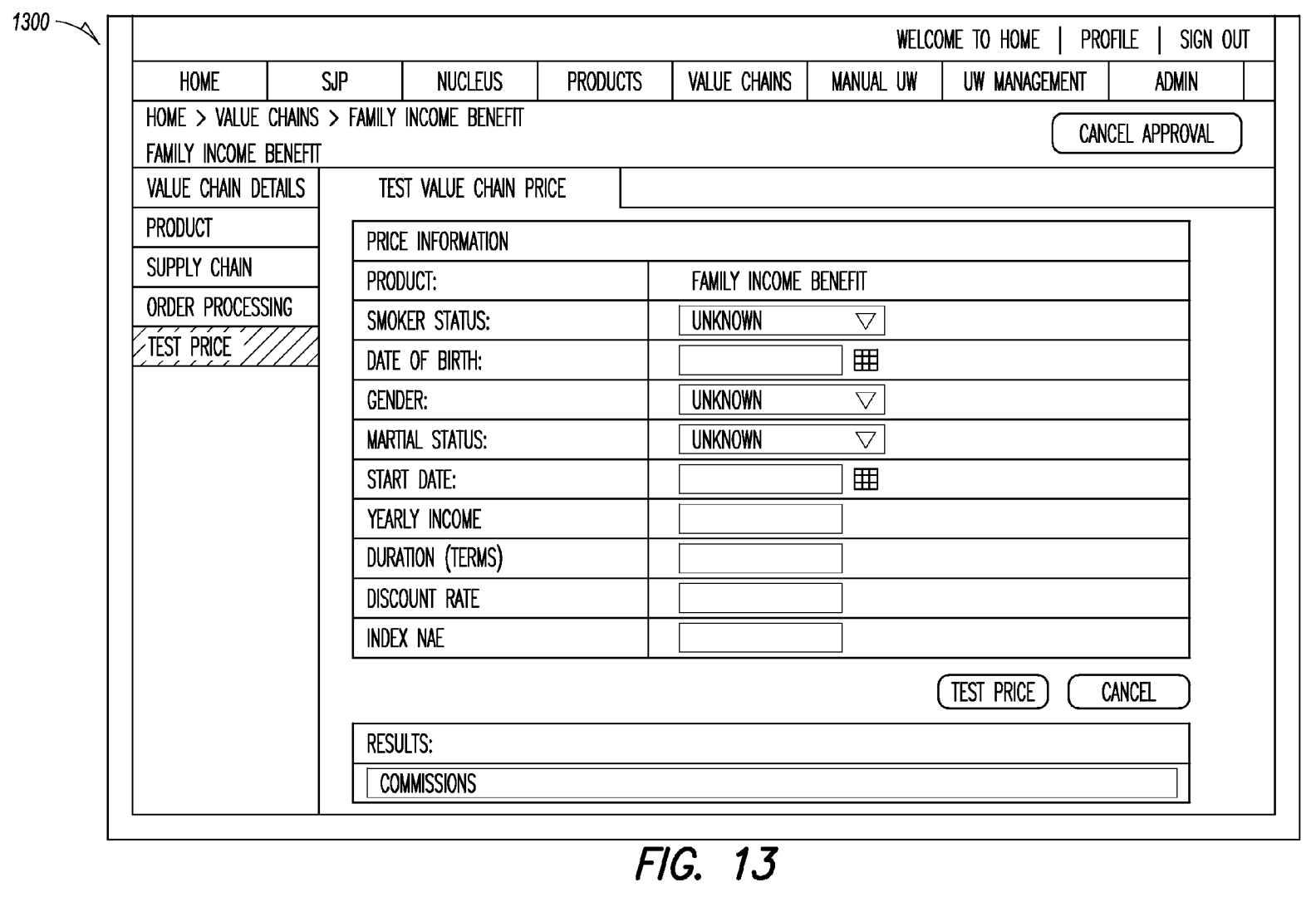

FIG. 13 is an example user interface 1300 for testing a price of a product. In various embodiments, the user interface 800 is generated or presented by the value module 204. The example user interface 1300 includes various boxes for specifying information about a person to which the product may be provided, including smoker status, date of birth, gender, marital status, start date (e.g., when the insurance product would become effective), yearly income, duration (or terms) (e.g., how long the insurance product would be effective), discount rate, and an index number. The example user interface also includes a Results box that the value module 204 may populate with a price of the product, including a breakdown of revenue allocations (e.g., corresponding to the revenue allocation table of the example user interface 1200).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 120) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 14:
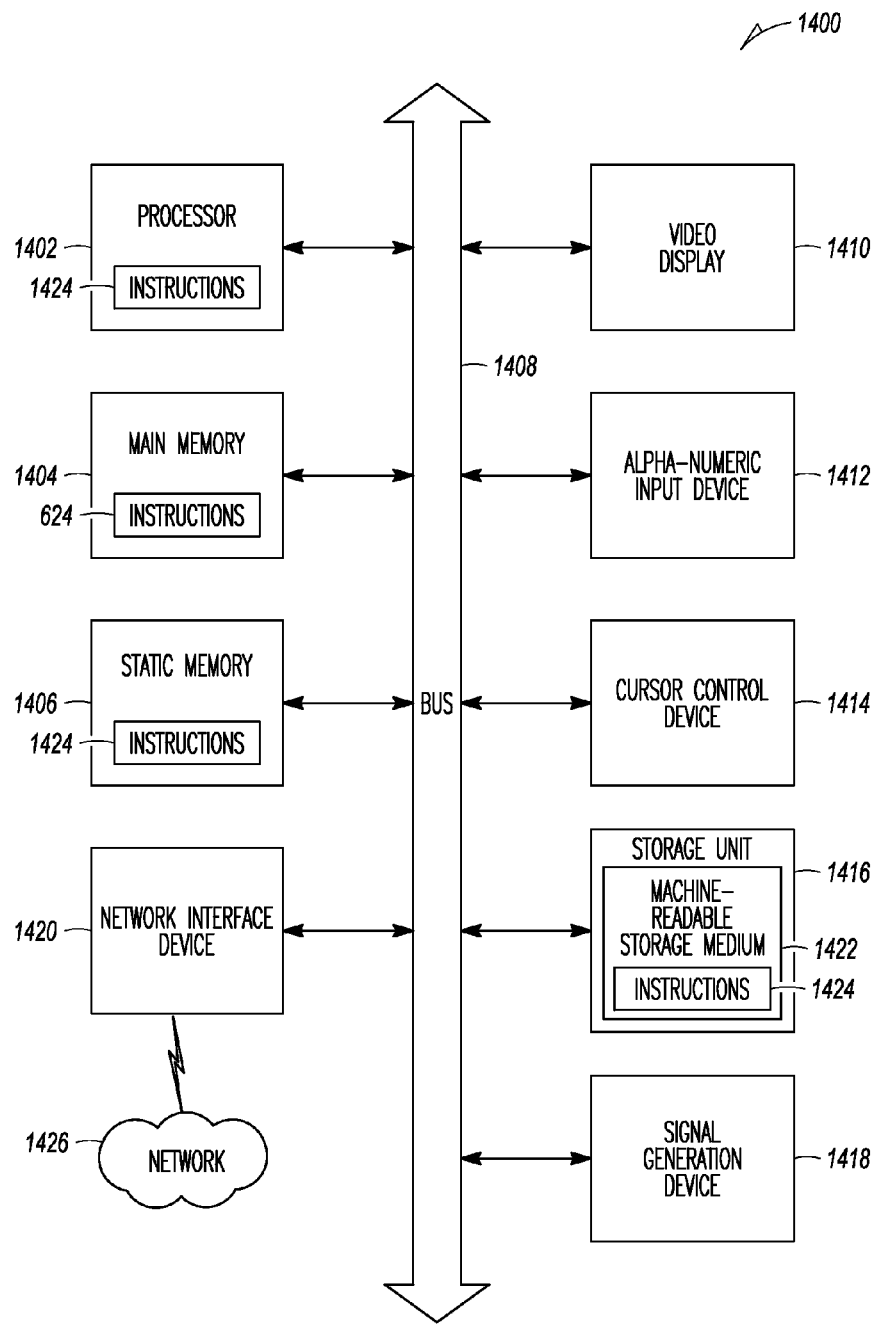
FIG. 14 is a block diagram of machine in the example form of a computer system within which instructions for causing the machine to perform any one or more of the methodologies discussed herein may be executed.

FIG. 14 is a block diagram of machine in the example form of a computer system 1400 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard), a user interface (UI) navigation (or cursor control) device 1414 (e.g., a mouse), a disk drive unit 1416, a signal generation device 1418 (e.g., a speaker) and a network interface device 1420.

The disk drive unit 1416 includes a machine-readable medium 1422 on which is stored one or more sets of instructions and data structures (e.g., software) 1424 embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media. The instructions 1424 may also reside, completely or at least partially, within the static memory 1406.

While the machine-readable medium 1422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1426 may be one of the networks 120.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a specification of an insurance policy having a set of attributes;
receiving sets of values corresponding to the set of attributes, the sets of values derived from negotiations with stakeholders of an insurance value chain;
generating versions of the insurance policy, each of the versions of the insurance policy corresponding to a unique one of the sets of values;
aggregating information regarding the versions of the insurance policy, the aggregating including identifying relative favorabilities of terms received by the stakeholders within the insurance value chain; and
generating a suggestion of one of the versions of the insurance policies to offer to a potential distributor based on the aggregating of the information, the generating of the suggestion being performed by one or more computer processors.

2. The method of claim 1, further comprising modifying a value of one of the sets of values based on input received via the user interface of the insurance value chain application.

3. The method of claim 1, wherein the attributes include at least one of a commission term, a payment term, an insurance rate, an exclusion, or a wording.

4. The method of claim 1, further comprising communicating the aggregation of the information regarding the versions of the insurance policy for presentation in a user interface, the presentation including a comparison of the sets of values of the versions of the insurance policy.

5. The method of claim 1, wherein the generating of the one of the suggested versions of the insurance policy based on the aggregating of the information includes comparing anticipated sales by the potential distributor of the one of the suggested versions of the insurance policy in comparison to actual volumes of sales of distributors of other versions of the insurance policy.

6. The method of claim 1, further comprising modifying a particular value set of the set of values based on a determination that the particular value set is out of line with respect to the relative favorabilities of the terms.

7. The method of claim 6, wherein the modifying of the particular value set is based on an acceptance of a suggestion made to an administrator.

8. The method of claim 1, further comprising:
determining ranges of values for an attribute of the set of attributes;
based on the ranges of values, determining all possible versions of the insurance policy with respect to the attribute; and
where in the aggregating includes flagging particular sets of values as active based on the received set of values.

9. A system comprising:
one or more modules implemented by one or more processors, the one or more modules configured to:
receive a specification of an insurance policy having a set of attributes;
receive sets of values corresponding to the set of attributes, the sets of values derived from negotiations with stakeholders of an insurance value chain;
generate versions of the insurance policy, each of the versions of the insurance policy corresponding to a unique one of the sets of values;
aggregate information regarding the versions of the insurance policy, the aggregating including identifying relative favorabilities of terms received by the stakeholders within the insurance value chain; and
generating a suggestion of one of the version of the insurance policies to offer to a potential distributor based on the aggregating of the information.

10. The system of claim 9, the one or more modules further configured to modify a value of one of the sets of values based on input received via the user interface of the insurance value chain application.

11. The system of claim 9, wherein the attributes include at least one of a commission term, a payment term, an insurance rate, an exclusion, or a wording.

12. The system of claim 9, further comprising communicating the aggregation of the information regarding the versions of the insurance policy for presentation in a user interface, the presentation including a comparison of the sets of values of the versions of the insurance policy.

13. The system of claim 9, wherein the generating of the one of the suggested versions of the insurance policy is based on the aggregating of the information includes comparing anticipated sales by the potential distributor of the one of the suggested versions of the insurance policy in comparison to actual volumes of sales of distributors of other versions of the insurance policy.

14. A non-transitory machine readable medium embodying a set of instructions that, when executed by a processor, cause the processor to perform operations comprising:
receiving a specification of an insurance policy having a set of attributes;
receiving sets of values corresponding to the set of attributes, the sets of values derived from negotiations with stakeholders of an insurance value chain;
generating versions of the insurance policy, each of the versions of the insurance policy corresponding to a unique one of the sets of values;
aggregating information regarding the versions of the insurance policy aggregating including identifying relative favorabilities of terms received by the stakeholders within the insurance value chain; and
generating a suggestion of one of the versions of the insurance policies to offer to a potential distributor based on the aggregating of the information.

15. The non-transitory machine readable medium of claim 14, wherein the operations further comprise modifying a value of one of the sets of values based on input received via the user interface of the insurance value chain application.

16. The non-transitory machine readable medium of claim 14, wherein the attributes include at least one of a commission term, a payment term, an insurance rate, an exclusion, or a wording.

17. The non-transitory machine readable medium of claim 14, the operations further comprising communicating the aggregation of the information regarding the versions of the insurance policy for presentation in a user interface, the presentation including a comparison of the sets of values of the versions of the insurance policy.

18. The non-transitory machine readable medium of claim 14, the generating of the one of the suggested versions of the insurance policy based on the aggregating of the information includes comparing anticipated sales by the potential distributor of the one of the suggested versions of the insurance policy in comparison to actual volumes of sales of distributors of other versions of the insurance policy.

* * * * *